E. G. STAUDE.
FOLDING AND GLUING MACHINE.
APPLICATION FILED MAR. 21, 1911.
1,104,013.
Patented July 21, 1914.
8 SHEETS—SHEET 1.
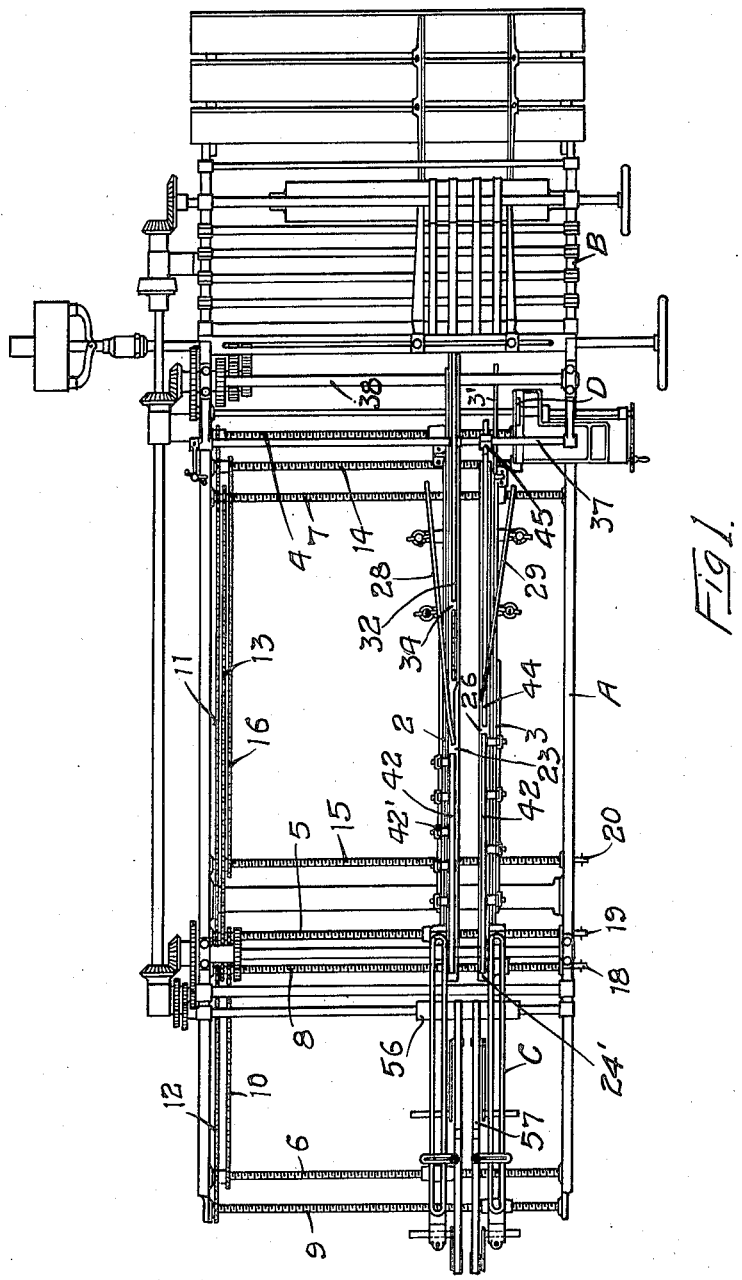
WITNESSES
INVENTOR
EDWIN G. STAUDE
BY
ATTORNEYS

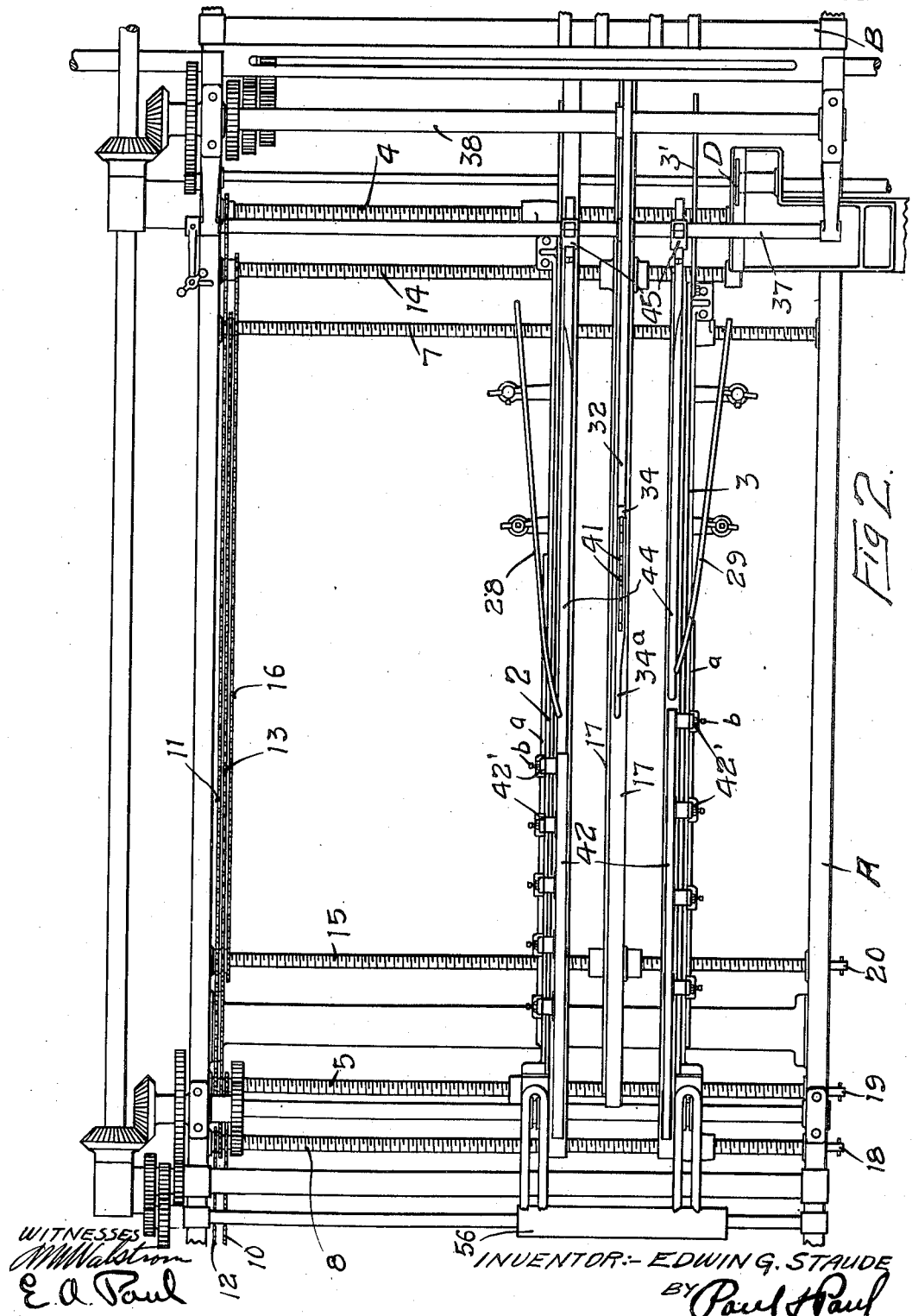

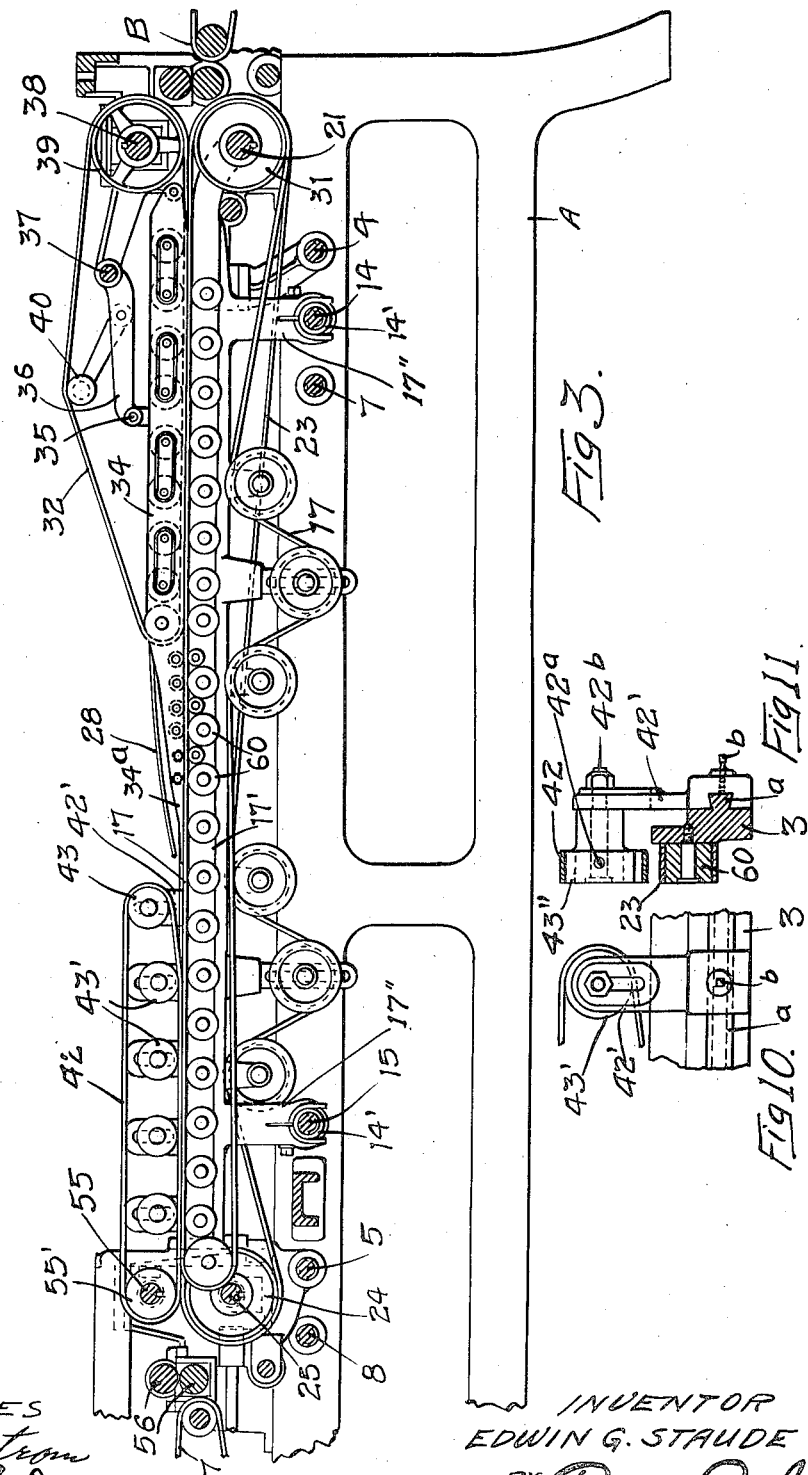

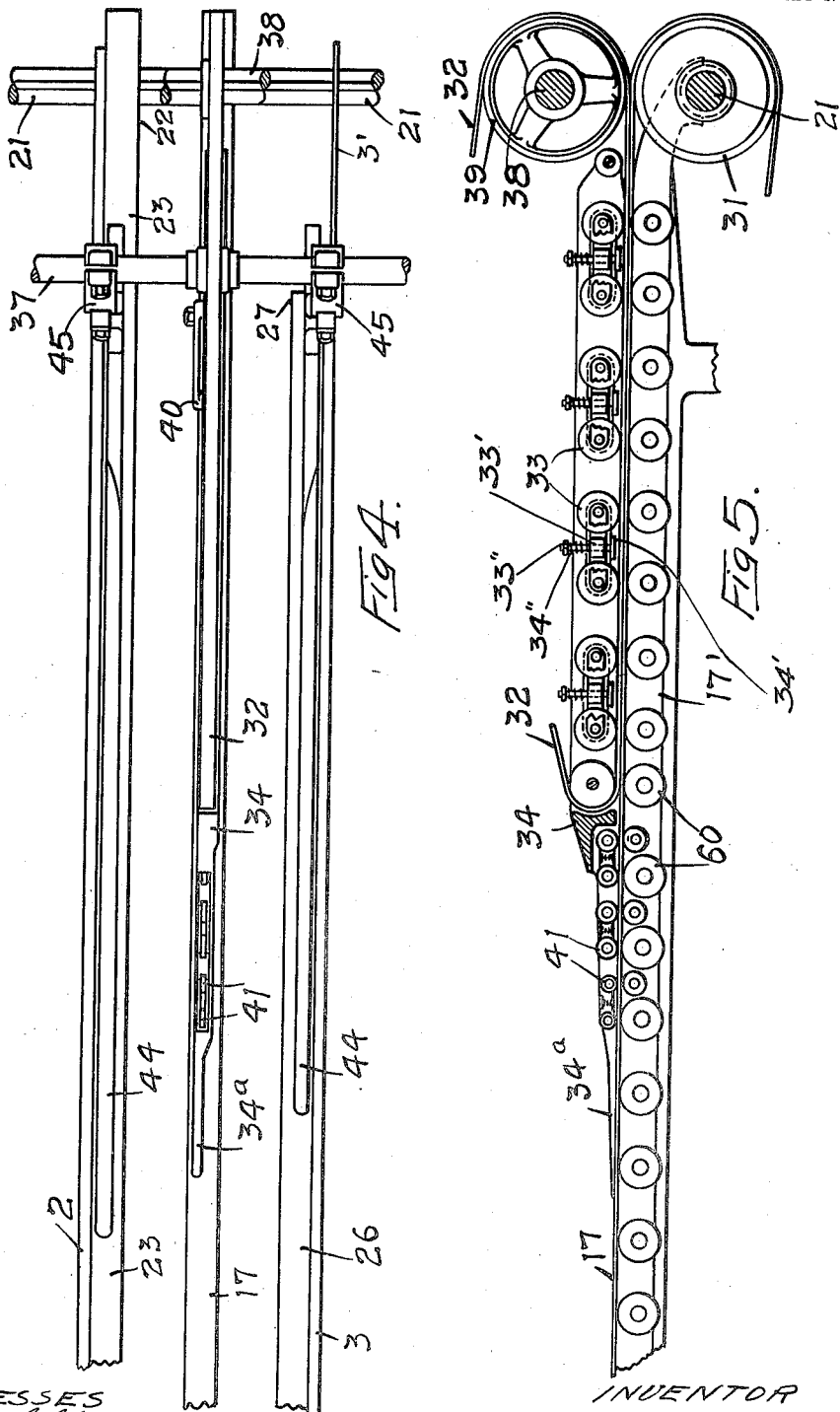

E. G. STAUDE.
FOLDING AND GLUING MACHINE.
APPLICATION FILED MAR. 21, 1911.

1,104,013.

Patented July 21, 1914.
8 SHEETS—SHEET 5.

WITNESSES
MMWalstrom
E. A. Paul

INVENTOR
EDWIN G. STAUDE
BY Paul & Paul
ATTORNEYS

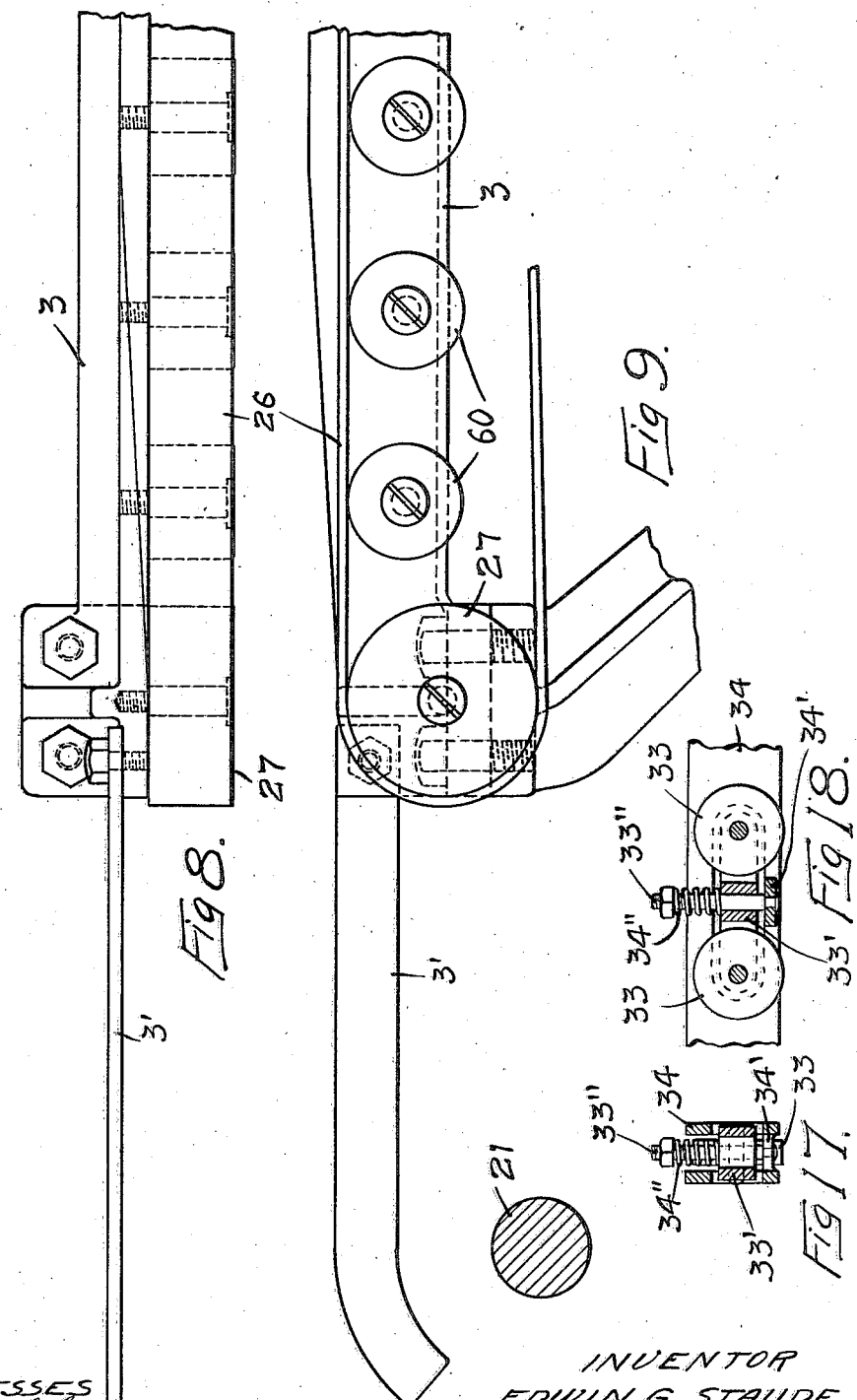

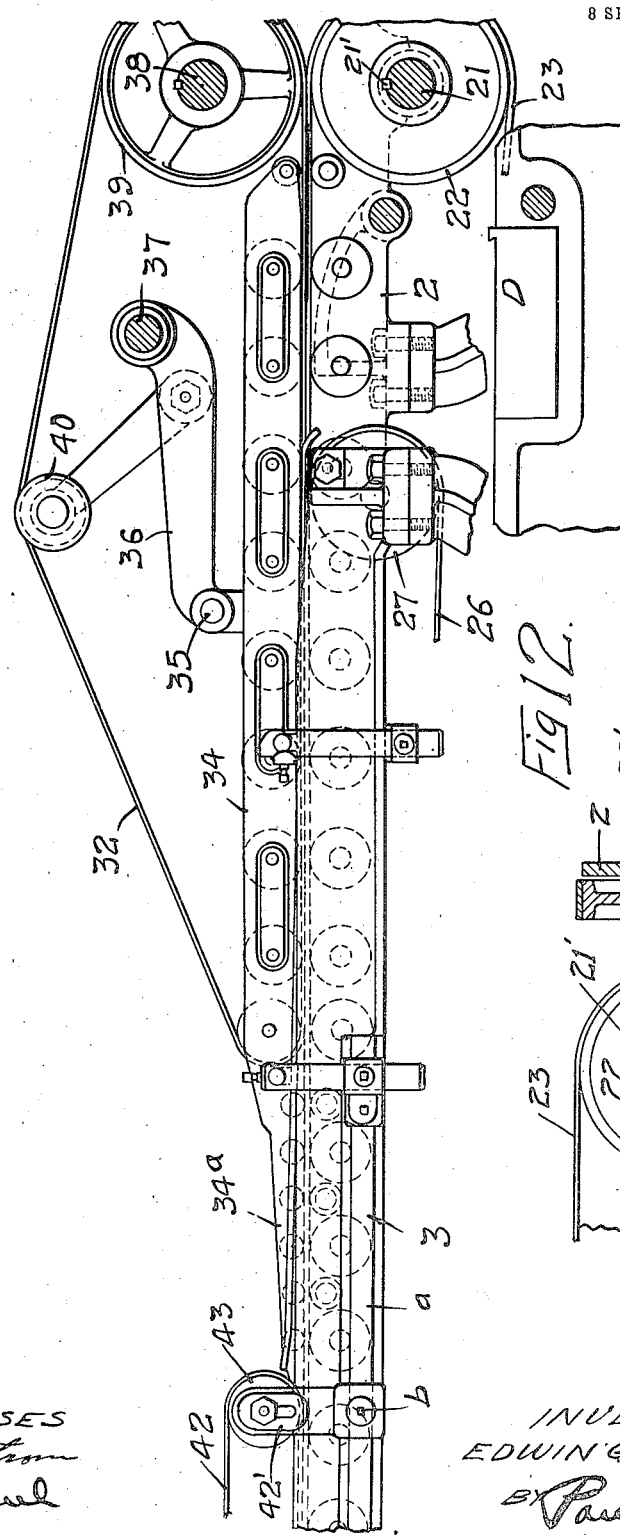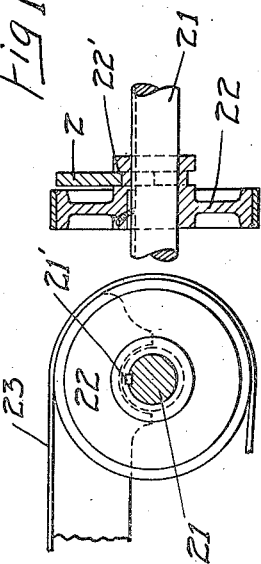

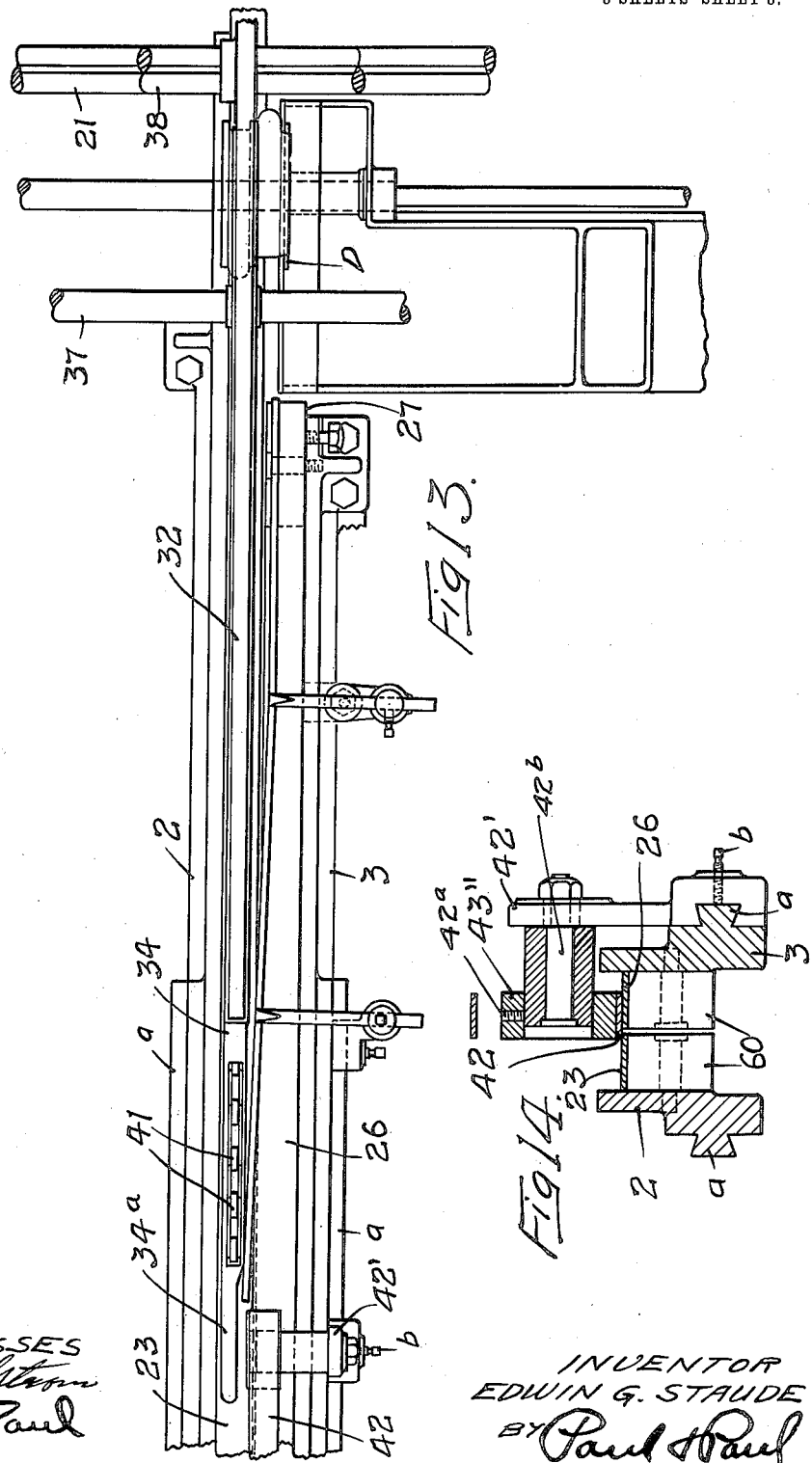

UNITED STATES PATENT OFFICE.

EDWIN GUSTAVE STAUDE, OF MINNEAPOLIS, MINNESOTA.

FOLDING AND GLUING MACHINE.

1,104,013.  Specification of Letters Patent.  Patented July 21, 1914.

Application filed March 21, 1911. Serial No. 615,999.

*To all whom it may concern:*

Be it known that I, EDWIN G. STAUDE, of Minneapolis, in the county of Hennepin, State of Minnesota, have invented certain Improvements in Folding and Gluing Machines, of which the following is a specification.

This invention relates to improvements in machines for automatically folding box or envelop blanks, or folding and gluing them, and the primary object of the invention is to provide a machine in which the flaps of the blanks may be folded or folded and glued with great rapidity as the blanks are fed through the machine.

A further object is to provide a machine which can be readily adapted for different sizes of blanks.

Other objects of the invention will appear from the following detailed description.

The invention consists generally in the constructions and combinations hereinafter described and particularly pointed out in the claims.

Figure 7:
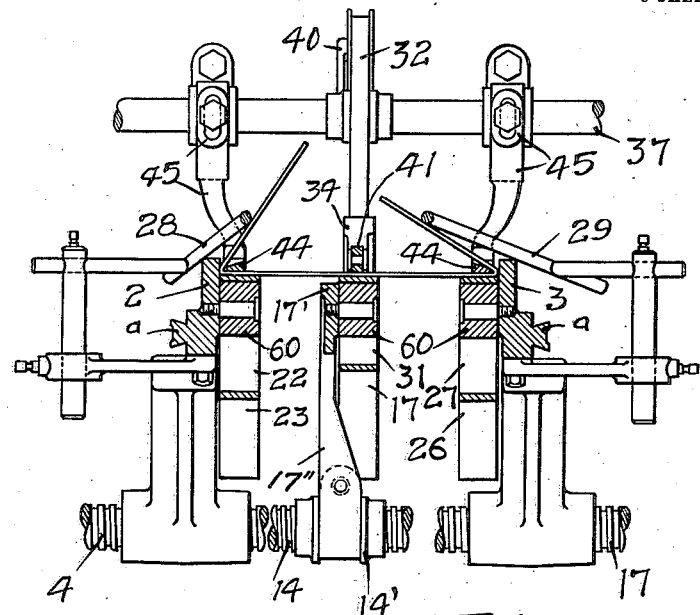
Figure 6:
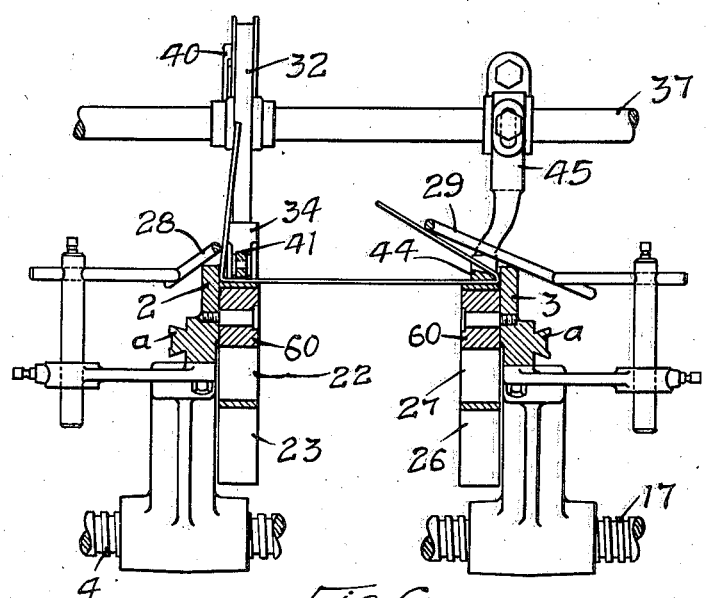

In the accompanying drawings forming part of this specification, Figure 1 is a plan view of a machine embodying my invention, as arranged for operating upon small or narrow blanks, Fig. 2 is a plan view of the machine with the feeding and stacking devices omitted and showing the machine arranged for operating upon blanks of larger size, Fig. 3 is a vertical, longitudinal section of the machine, Fig. 4 is a plan view showing the carrier belts, intermediate upper carrier belt, the formers, and some of the parts connected therewith, Fig. 5 is a partial side elevation of the intermediate conveyer belt and supporting devices and the upper carrier belt and shoe, Fig. 6 is a transverse, vertical section showing the conveying and folding devices when the machine is arranged for operating upon small blanks, as shown in Fig. 1 of the drawings, Fig. 7 is a similar view showing the machine arranged for operating upon large blanks, as illustrated in Fig. 2 of the drawings, Fig. 8 is a plan view of the left hand carrier, Fig. 9 is a side elevation of the same carrier belt and the means for supporting the same, Fig. 10 is a side elevation of a bracket supporting a presser belt, Fig. 11 is a transverse section of the rail supporting the forward end of one of the presser belts, Fig. 12 is a vertical, longitudinal, sectional view showing the intermediate carrier and the position of the glue pot support, Fig. 13 is a plan view of the same, showing in addition the glue pot in position for use, Fig. 14 is a sectional view showing the side carriers brought close together for operating on small blanks, Fig. 15 is a detail view of the means of mounting the carrier frames, Fig. 16 is a detail sectional view showing the annular groove in the hub of the carrier belt pulley. Figs. 17 and 18 are detail views showing the manner of mounting the tension devices in the upper carrier frame.

In all of the drawings, A represents the main frame of the machine, which may be of any suitable size or construction. At the forward end of the machine is a suitable feeding device B, which is adapted to feed the blanks, either box or envelop, in succession to the folding and gluing devices, and at the rear of the machine is a suitable receiver and stacker C, which is adapted to receive and stack the folded and glued boxes or envelops. As the feeding and stacking devices herein indicated, generally by the reference letters B and C, do not form any part of my present invention, I do not particularly describe the same, nor do I limit myself to the use with this machine of any particular feeding or stacking devices, as the folding and gluing mechanisms may be used with any suitable feeder and with any suitable device for receiving and holding the boxes or envelops after they have been folded and glued.

In the drawings I have indicated the right side folder frame by the reference figure 2 and the left side folder frame by the reference figure 3. These folder frames 2 and 3 extend lengthwise of the machine, the frame 2 being supported by threaded screw-shafts 4, 5 and 6, and the frame 3 by threaded screw-shafts 7, 8, and 9. The screw-shafts 5 and 6 are connected by a sprocket chain 10 and the screw-shafts 5 and 4 are connected by a sprocket chain 11. The screw-shafts 8 and 9 are connected by a sprocket chain 12 and the screw-shafts 8 and 7 are connected by a sprocket chain 13. Similar screw-shafts 14 and 15 are connected by a sprocket chain 16 and these shafts support a frame 17' which in turn supports the intermediate carrying belt 17. By placing a suitable crank at a point 18, 19, or 20, and operating the same either of the folder frames or the frame for the center carrying device can be adjusted to any point across the machine. At the forward end of the side folder frames and the intermediate carrying device, I mount a shaft 21 having a pulley 22 over which operates a belt 23. (See Fig. 12). The forward end of the folder frame 2 engages an annular groove 22' on the hub of the pulley 22, (Fig. 15), so that as the frame 2 is moved across the machine it moves the pulley along the shaft 21, and the pulley is permitted to make this movement by having a key 21' fastened to the hub, which slides in a groove in the shaft 21. (See Figs. 12, 15 and 16). The rear end of the belt 23 passes over a pulley 24, which is similarly mounted on a shaft 25. (See Fig. 3). The belt 23 just described serves as a carrier for the right side folder frame 2 and it will be noted that by operating the crank at the point 19, (Fig. 2) the folder frame 2, the pulleys 22 and 24 which drive the belt 23 and the belt 23 will all move laterally together. In this way I am able to adjust the frame 2 with its carrying and folding mechanism very rapidly, transversely of the machine.

The folder frame 3 is similar to the folder frame 2 except that its carrier belt 26 does not pass around a pulley on the shaft 21 at its forward end, but passes around an idler 27 secured to the frame, as shown in Figs. 4, 8, 9 and 12 of the drawings. The folder frame 3 is preferably shorter than the opposite frame, as shown in Fig. 1, to allow the transverse movement of the glue pot past the end of the frame 3. (See Fig. 13). This construction allows the adjustment of the glue pot to a point where the glue can be applied to the flaps of comparatively small blanks. As shown in Figs. 8 and 9, I prefer to provide a bar 3' forming a continuation of the frame 3 and extending forwardly over the screw shaft 4 for the purpose of guiding the blank to the carrier belts. The belt 26 is driven from a pulley 24' on the shaft 25 similar to the pulley 24. (See Fig. 1). A crank operated at the point 18 will adjust the left hand folder frame 3 with its folding mechanism, carrier belt, etc., to any desired point across the machine. (See Fig. 1.)

Mounted on the frame 2 is an adjustable, inclined folder bar 28 and similarly mounted on the folder frame 3 is a similar inclined adjustable folder bar 29. (See Fig. 2). These bars serve to turn up and then fold inward and downward the side flaps of the blanks, as indicated in Figs. 6 and 7 of the drawings, one of said side flaps being folded in advance of the other so that one flap is turned down onto the middle portion of the blank end and the other flap is turned down onto the first flap. As the blanks are fed into the machine the flap that is to be underneath when both flaps are folded has its edge passed over a suitable gluing device D by which the desired amount of glue will be applied to the flap near the edge thereof. I do not in this application describe in detail the construction of the gluing device, as the same forms no part of my present invention.

The intermediate carrier belt 17 is driven from a pulley 31 on the shaft 21, (see Fig. 3) and the three carrier belts 17, 23 and 26 are moved at the same rate of speed to carry the blanks through the machine. To coöperate with the intermediate carrier belt 17 I provide an upper carrier belt 32, (see Figs. 2, 3, and 12) which is held in contact with the lower belt 17 by suitable idle rolls 33. (See Fig. 5). These rolls are mounted in a suitable tension device to permit them to adjust automatically to various thicknesses of box blanks. Each of the tension devices comprises, preferably, a truck 33' vertically slidable on a stud 33" which is mounted on a plate 34' carried by the frame 34. A spring 34" yieldingly holds the truck 33 in its depressed position. By increasing or decreasing the tension of the spring the pressure of the rolls 33 may be regulated as desired. The frame 34 supporting the tension devices is pivoted at a point 35 on an arm 36 that is carried by a shaft 37. (See Fig. 12). This construction is shown clearly in Fig. 3 of the drawings.

A shaft 38 is mounted directly above the shaft 21 and carries a pulley 39 which operates the carrier belt 32. (See Fig. 12). A suitable tightening device 40 keeps the belt at the proper tension. The forward end 34ª of the frame 34 is tapered and supports the idler rolls 41 which bear directly upon the belt 17 or on the blank which is being passed through the machine. The object of these idler rollers is to keep the blanks moving from the point where they leave the belt 32 until they are engaged by the side presser belts 42, which are mounted at one end upon a pulley 55', (see Fig. 3), on the shaft 55 and at the other end on a pulley 43 adjustably mounted in brackets 42' that are mounted on the folder frames 2 and 3. (See Figs. 3, 12, and 14). Each of the folder frames 2 and 3 is provided with a longitudinally extending rib a, (Figs. 6 and 7) preferably of dove-tailed shape in cross section and the brackets 42' are preferably adjustably arranged upon these ribs, being secured in position by set-screws b. (Figs. 11 and 14). The pulley 43, mounted in the forward bracket, is preferably set a short distance above the top of the side carrier belt so that the forward end, or receiving end, of the presser belt 42 is slightly elevated to allow the entrance of the blanks between the belts while the pulleys 43', any suitable number of which may be employed, are set quite close to the top of the carrier belt so as to bring the lower stretch of the presser belt 42 in contact with the upper surface of the side carrier belt. (Fig. 3).

In Fig. 14 I have illustrated the side frames and their carrier belts adjusted close together for operating on small blanks and when used in this way I prefer to mount a ring 43'' on the studs 42$^b$, securing said ring by means of a set-screw 42$^a$ to said stud. This bearing ring is adjustable back and forth on the stud and as shown in Fig. 14 it may be set to overhang the abutting edges of the carrier belts and coöperate with the presser belt 42 to advance the blanks, the other presser belt being preferably omitted.

The inclined folders 28 and 29 extend to points near the forward ends of the presser belts 42. (Fig. 2). To hold the blanks down upon the belts 23 and 26 I provide suitable formers 44 consisting preferably of metal bars mounted in suitable brackets 45 adjustably supported by the shaft 37. (Fig. 2). These formers are preferably adjusted at their forward end, or the end toward the front or receiving end of the machine at quite a little distance above the surface of the coöperating or underlying carrier belt. I have usually found it desirable to have a space of about one-eighth of an inch between the under surface of the former and the opposing surface of the carrier belt at this point, while at the rear end of the former it may be permitted to touch or be very close to the surface of the belt. These formers are adjusted transversely of the machine so as to stand just inside of the scored lines of the blanks and hold down the blanks on the carrier belts and prevent the middle portions of the blanks from moving upward as the flaps are turned upward by the folders 28 and 29.

When it is desired to operate the machine on blanks that are more than four inches wide when folded flat, I prefer to use the three lower carrier belts with the upper carrier in position over the central carrier belt 17, as shown in Figs. 2 and 7 of the drawing.

To permit the gluing of blanks of less width than may be conveniently run on the machine when the three carrier belts are employed, I remove the frame 17' which supports the carrier belt 17. This frame 17' is made capable of removal by providing standards 17'' having forked lower ends, (Figs. 3 and 7) engaging grooves on nuts 14' which travel on the screw-shafts 14 and 15. (Fig. 3). I also for this purpose remove the belt 17 and the former 44 over the folder frame 2.

By moving the upper carrier belt 34 to the right over the belt 23 and sliding the arm 36 on the shaft 37, I can utilize the edge of the frame 34 and the tapered end 34$^a$ of said frame as a former. (Figs. 3, 6 and 12). I may also bring the folder frames 2 and 3 any desired distance toward each other and may, in fact, bring them so close that the belts 23 and 26 will contact and form practically a single belt.

The object of running the carrier belt 26 around the idle pulley 27 instead of around the pulley on the shaft 21, is to provide room for the glue applying device D and permit it to be adjusted close to the carrier frame 2 when small blanks with narrow panels are to be folded and glued. At the rear of the machine I preferably provide feed rolls 56, which receive the folded blanks from the presser belts 42 and deliver them to suitable belts 57 by which they are delivered to the receiving or stacking device.

The folder frames 2 and 3 and the frame for the center carrier are each preferably provided with suitable anti-friction rolls 60, over which the carrier belts pass.

The forward end 34$^a$ of the frame 34, as shown plainly in the drawings, is reduced in width by being recessed preferably on one side so that when the intermediate carrier frame is removed and the upper carrier frame is used in connection with one of the side frames, this forward end 34$^a$ will be sufficiently narrow to prevent it from interfering with the side carrier belts when the side frames are adjusted for operating on very small blanks.

This machine, while adapted generally for operating on box blanks, may also be used for folding other blanks, such as for envelops and the like.

I claim as my invention:—

1. The combination, with the side folder frames and carrier belts therefor, of presser belts carried by the folder frames and arranged above said carrier belts, the folder frame carrier belt and presser belt on one side of the machine being adjustable toward or from the corresponding parts on the other side of the machine, rolls for said presser belts, the rolls of one of said presser belts being adjustable longitudinally of their axes of rotation and in parallelism with the carrier belt.

2. The combination with the laterally adjustable side folder frames and carrier belts therefor, of presser belts and rolls therefor carried by the folder frames and transversely adjustable with said folder frames, and means for moving one of said presser belts laterally relatively to the carrier belt of the adjacent folder frame.

3. The combination, with the side folder frames and carrier belts therefor, of an intermediate carrier frame and carrier belt and an upper carrier belt coöperating with said intermediate carrier belt, one of said side frames being shorter than said intermediate frame, and a gluing device operating transversely of said frames past the end of said shorter frame.

4. The combination, with the side carrier frames and carrier belts therefor and means for adjusting said frames and belts laterally to bring them into close coöperating relation with one another, one of said frames being shorter than the other frame, and a gluing device also transversely adjustable and capable of movement past the end of said shorter frame to permit the application of glue to comparatively small blanks.

5. The combination, with the side folder frames and carrier belts therefor, of an intermediate carrier frame and carrier belt and an upper carrier belt coöperating with said intermediate carrier belt, said intermediate frame having depending standards having forked lower ends, transverse screw shafts having a driving connection between them, nuts mounted on said shafts and engaging the forked lower ends of said standards, whereby the revolution of said shafts will move said intermediate frame laterally between said side frames.

6. The combination, with the side folder frames and carrier belts and folders therefor, of an upper carrier frame and carrier belt therefor, said side frames and said upper frame being laterally adjustable, said upper frame having a recessed forward portion to adapt it for use with said side frames and belts in operating upon small blanks.

7. The combination, with the side frames and folders and carrier belts therefor, of an intermediate carrier frame and belt, an upper frame and carrier belt arranged to coöperate with said intermediate carrier belt, tension devices carried by said upper carrier frame, and positioned between the upper and lower runs of the belt of said frame, said tension devices being composed of a series of independent vertically sliding trucks and pressure wheels mounted thereon, and means for yieldingly holding said trucks and pressure wheels toward the work.

8. The combination, with the side carrier frames and belts and folders, of an intermediate carrier frame and belt, an upper frame and belt therefor, a plate mounted in said upper frame and having an upwardly projecting stud, a truck vertically slidable on said stud and having bearing wheels, and included between the side walls of said frame and the upper and lower runs of the belt of said frame, and a spring mounted on said stud and having means for increasing or decreasing its tension to regulate the pressure of said truck wheels on the blanks.

9. The combination, with the side frames, carrier belts therefor and folders, of an intermediate frame and carrier belt, an upper frame and belt therefor, said upper frame being composed of side rails spaced apart, said side rails having openings extending transversely therethrough, a truck fitting within said openings and having a limited vertical movement therein, and positioned between the upper and lower runs of the belt of said frame, pressure wheels carried by said truck and means for yieldingly holding said truck down upon the work.

10. The combination, with a carrier frame and belt, of an upper frame and belt therefor overhanging said first named frame and belt, said upper frame having opening therein, a tension device comprising a truck and carrying wheels therefor fitting within said opening and having a limited vertical movement therein, between the upper and lower runs of the belt of said frame, and means for yieldingly holding down said truck and pressure wheels.

11. The combination, with the side carrier frames and belts and folders, of an intermediate carrier frame and belt, an upper frame and belt coöperating with said intermediate belt, said upper frame being composed of rails spaced apart and having openings therethrough, a plate secured to said rails in said opening and having a centrally arranged upright stud thereon, and a tension device vertically slidable on said stud and having means for contacting with the lower runs of the belt, the tension device being positioned between the upper and lower runs of the frame belt.

12. The combination, with a carrier frame and belt, of an upper carrier frame and belt therefor arranged to coöperate with said first named belt, said upper frame having a transverse opening therein, and a tension device having pressure wheels mounted in said frame within said opening and included between the opposite side faces of said frame and the upper and lower runs of the frame belt.

13. The combination, with the side folder frames and carrier belts therefor, of presser belts arranged above said carrier belts, supports for said presser belts, studs mounted thereon, rolls journaled on said studs and rings adjustable horizontally on said rolls and encircled by one of said presser belts, the adjustment of said ring moving its presser belt laterally with respect to the adjacent carrier belt.

14. The combination, with a machine frame, of side folder frames mounted therein and carrier belts therefor, upright brackets mounted on said frame, studs mounted in said brackets and projecting inwardly therefrom, rolls journaled on said studs, presser belts encircling said rolls, the studs at the receiving ends of said presser belts being vertically adjustable in their brackets to allow the receiving ends of said presser belts to be spaced from said carrier belts to facilitate the entrance of the blanks between them.

15. The combination, with a side folder frame and carrier belts therefor, of an intermediate carrier frame and carrier belt therefor, an upper carrier frame, a belt for said frame, a pivoted arm whereon said upper carrier frame is pivotally supported at a point intermediate to its ends between the upper and lower runs of the belt, and tension devices for holding said upper frame belt upon said intermediate carrier belt.

16. The combination, with an intermediate carrier frame and a belt therefor, of an upper carrier frame, a belt for said upper frame, tension devices mounted in said upper frame between the upper and lower runs of the belt and operating to hold its belt upon said intermediate carrier belt, and a pivoted arm whereto the middle portion of said upper carrier frame is pivotally connected.

17. The combination, with the intermediate carrier frame and a belt therefor, of an upper carrier frame, a belt for said upper frame, tension devices mounted in said upper frame between the upper and lower runs of the belt and operating to hold the lower run of said upper frame belt upon the upper run of said intermediate belt, said upper frame having a forwardly projecting portion and idle wheels mounted in said forwardly projecting portion and arranged to bear upon said intermediate carrier belt.

18. The combination with a side folder frame and a carrier belt therefor, of a second carrier frame and carrier belt therefor to one side of the first mentioned frame, said second frame having depending standards provided with forked lower ends, transverse screw shafts having driving connections between them and nuts mounted on said shafts and engaging the lower forked ends of said standards, whereby the revolution of said shafts will move said intermediate frame laterally.

In witness whereof, I have hereunto set my hand this 15th day of March, 1911.

EDWIN GUSTAVE STAUDE.

Witnesses:
GENEVIEVE E. SARENSEY,
EDWARD A. PAUL.